A. SCHUSTEK.
MECHANICAL MOVEMENT.
APPLICATION FILED JAN. 19, 1911.
1,033,477.
Patented July 23, 1912.
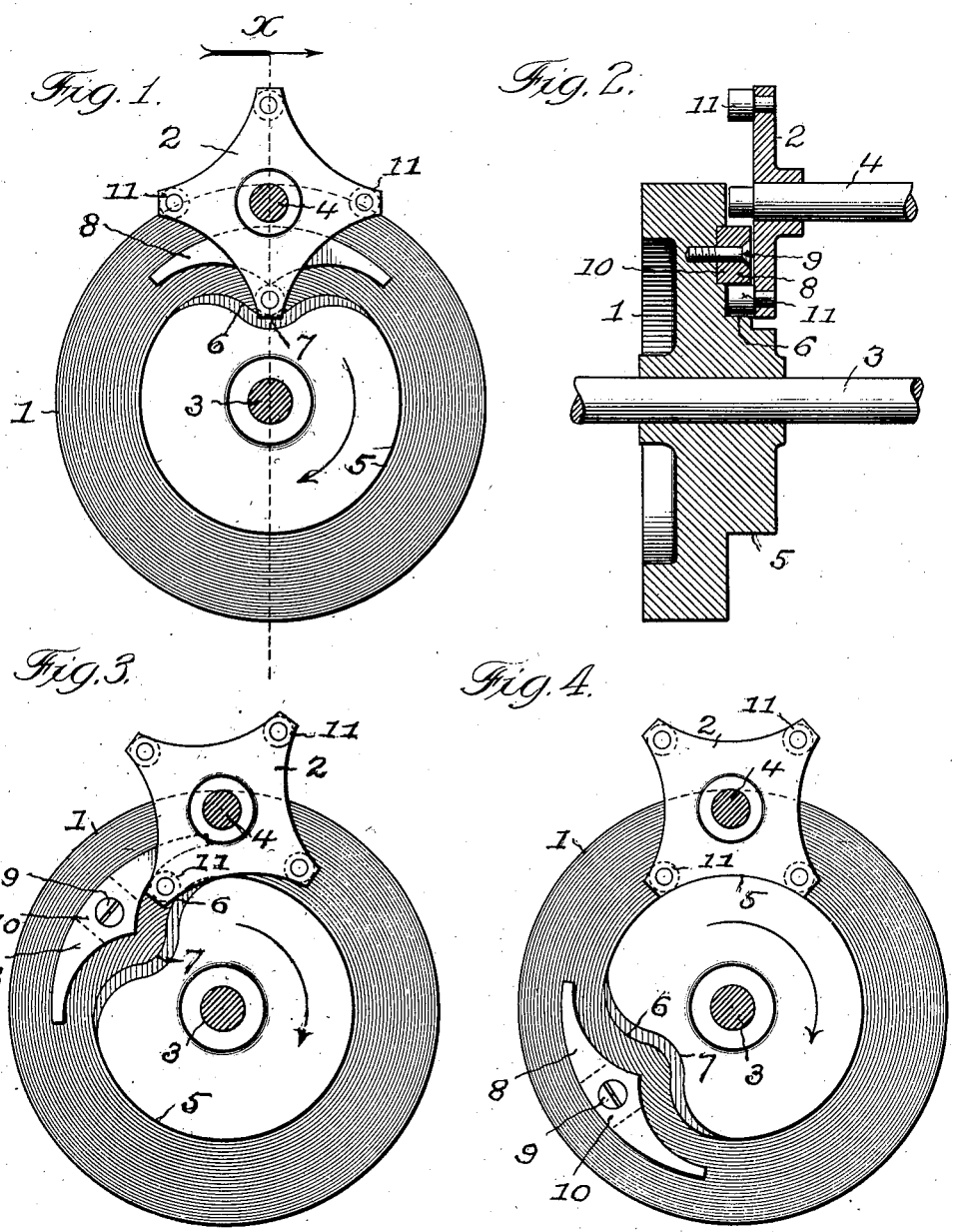

UNITED STATES PATENT OFFICE.

ANDREW SCHUSTEK, OF CHICAGO, ILLINOIS.

MECHANICAL MOVEMENT.

1,033,477.   Specification of Letters Patent.   Patented July 23, 1912.

Application filed January 19, 1911. Serial No. 603,455.

*To all whom it may concern:*

Be it known that I, ANDREW SCHUSTEK, a citizen of the United States of America, and a resident of Chicago, in the county of Cook and State of Illinois, have invented certain new and useful Improvements in Mechanical Movements, of which the following is a specification.

This invention relates to mechanisms for converting continuous rotary into intermittent rotary motion, and the present improvement has for its object to provide a simple and durable structural formation and combination of parts adapted to provide a uniform speed of rotation of the driven member during its intermittent travel, and which is capable of ready modification to provide any required variation in such speed, and with which the meshing and unmeshing of the driving and driven members takes place with but very little shock or wear, all as will hereinafter more fully appear.

In the accompanying drawings:—Figure 1, is a sectional elevation of a mechanism embodying the present invention. Fig. 2, is a transverse section on line $x$—$x$, Fig. 1. Figs. 3 and 4, are views similar to Fig. 1, and illustrating in connection therewith the different position of parts in one cycle of the mechanism.

Similar reference numerals indicate like parts in the several views.

Referring to the drawings, 1 and 2 represent the respective driving and driven members of the present construction, supported by shafts 3 and 4, which in turn are journaled in suitable bearings to maintain the parts in proper rotative engagement. In the present construction the aforesaid driving member 1 is provided on one side with a hub or boss, the greater portion of the periphery of which is formed concentric with the axis of rotation of said driving member, while another portion 6 of said periphery is made reëntrant to converge preferably in a curved manner into a middle cusp 7, located a distance in from said periphery corresponding with the amount of semi-rotation that is to be imparted to the driven member 2, hereinafter described.

8 is a cam piece or keeper secured to the side of the driving member 1 on which the aforesaid hub or boss is disposed. Said cam piece 6 is arranged in separated relation to the converging portions 6 and cusp 7 above described, and in conjunction therewith form a channel or groove of a corresponding shape as shown, and to such end the face of said cam piece or keeper opposite the converging portions 6 and cusp 7 will be of a curved angular form corresponding to the reëntrant form of the said parts, with its central ridge in diametric relation to the center of the cusp 7 as shown. In manufacture said keeper 8 is made as a separate part and secured in place by a screw 9 and non-circular lug 10, which fits a corresponding non-circular socket in the side of the driving member 1. And it is preferred that the counterpart end wings of the keeper 8 be left unattached so that the same may yield slightly by inherent elasticity of the metal under excessive stress to prevent jarring or breaking of the parts.

The driven member 2 of the mechanism is of the usual star shape, the multiple outer ends of which being provided with a concentric series of lateral studs or pins 11, in manner similar to the well known Geneva movement, and like said movement the periphery of said driven gear 2, intermediate of the aforesaid stud carrying outer ends, will have a concave form with a radius equal to that of the concentric portion 5 of the driving member 1, before described, and adapted to ride in turn thereon during the stationary conditions of the driven member in the normal operation of the mechanism.

In the construction shown in the drawings, the portion of the main body of the driving member 1 in the path of the outer ends of the aforesaid stud carrying extensions of the driven member 2, is cut away to afford clearance for the outer ends of said extensions.

The operation of the present mechanism is substantially the same as the Geneva movement above referred to, with the difference that the studs or pins 11 of the driven member have, in the preferred form of the present invention shown in the drawings, a uniform speed of rotation during their passage through the channel or groove of the driving member aforesaid, and each stud will enter at one end of said groove and leave at the other end of the groove, and is followed by an intermediate engagement between the concentric portion 5 of the driving member and the next adjacent concave in the periphery of the driven member, to hold for a predetermined period the said driven member against rotation.

With the present construction the uniform speed of the driven member in its intermittent rotation, as above described, can be readily varied by a change in the form of the curvature of the aforesaid operating groove of the driving member, to meet any usual or ordinary requirement.

Having thus fully described my said invention what I claim as new and desire to secure by Letters Patent, is:—

1. In a mechanism for converting continuous rotary motion into intermittent rotary motion, the combination of a driving member provided with a lateral hub or boss having a portion of its periphery concentric with the axis of rotation and another portion curved to converge into a middle cusp, a keeper secured to a side of the driving member in separated relation to said converging portion of the driving member with its surface opposed to said converging portion of a corresponding form to provide an intermediate converging channel, and a driven member provided with a concentric series of lateral studs adapted for serial engagement with the aforesaid channel and with a series of concave portions in its periphery intermediate of said studs, substantially as set forth.

2. In a mechanism for converting continuous rotary motion into intermittent rotary motion, the combination of a driving member provided with a lateral hub or boss having a portion of its periphery concentric with the axis of rotation and another portion curved to converge into a middle cusp, a keeper secured to a side of the driving member at its middle with its end portions free to yield under undue strain, said keeper having a separated relation to the converging portion of the driving member with its surface opposed to said converging portion of a corresponding form to provide an intermediate converging channel, and a driven member provided with a concentric series of lateral studs adapted for serial engagement with the aforesaid channel and with a series of concave portions in its periphery intermediate of said studs, substantially as set forth.

Signed at Chicago, Illinois, this 14th day of January 1911.

ANDREW SCHUSTEK.

Witnesses:
ROBERT BURNS,
ANTON MEYER.